United States Patent [19]

Tamai

[11] Patent Number: 4,550,322

[45] Date of Patent: Oct. 29, 1985

[54] DROP SENSOR FOR AN INK JET PRINTER

[75] Inventor: Masayoshi Tamai, Kanagawa, Japan

[73] Assignee: Fuji Xerox Co., Ltd., Tokyo, Japan

[21] Appl. No.: 601,466

[22] Filed: Apr. 18, 1984

[30] Foreign Application Priority Data

May 7, 1983 [JP] Japan ................................ 58-79665

[51] Int. Cl.[4] ........................ G01D 15/18; G02B 5/14

[52] U.S. Cl. ........................................ 346/75; 250/227

[58] Field of Search ........................... 346/75; 250/227

[56] References Cited

U.S. PATENT DOCUMENTS 4,255,754 3/1981 Crean et al. .......................... 346/75

4,344,078 8/1982 Houston ............................... 346/75

*Primary Examiner*—E. A. Goldberg

*Assistant Examiner*—Gerald E. Preston

*Attorney, Agent, or Firm*—Sughrue, Mion, Zinn, Macpeak & Seas

[57] ABSTRACT

A drop sensor for an ink jet printer for determining the two-dimensional position of an ink drop as it flies through the sensor. A plurality of light emitting elements emit light beams which cross in pairs in the space defined by the sensor. A plurality of light receiving elements are aligned to receive the light beams projected from specific light emitting elements and to generate signals having magnitudes proportional to the intensities of the light received by the light receiving elements. A plurality of differential amplifier circuits compare the outputs of adjacent light receiving elements to determine whether an ink drop is coincident with selected matrix points within the sensor.

10 Claims, 10 Drawing Figures

DROP SENSOR FOR AN INK JET PRINTER

FIELD OF THE INVENTION

This invention relates to a drop sensor for an ink jet printer which can detect the positions of ink drops in two dimensions with high accuracy.

BACKGROUND OF THE INVENTION

One example of a conventional ink jet printer is shown in FIG. 1. The ink jet printer comprises a plurality of drop generators 2 for jetting ink drops 1 in the direction z according to a predetermined drop forming frequency. Charging electrodes 3 are provided for selectively charging the drops 1 according to printing signals as the ink drops 1 fly in the direction z. Deflecting electrodes 5 are inclined by an angle $\theta$ corresponding with the speed of movement of a recording sheet 4 which is moving in the direction y. Each deflecting electrode successively deflects, in a deflecting plane forming the same angle $\theta$, the flying ink drops 1*a*, 1*b*, . . . 1*n*. A sensor 6, including a light emitting unit 6*a* having a light emitting diode array and a light receiving unit 6*b* having a photo-transistor array, detects the positions of the flying ink drops 1*a*, 1*b*, . . . 1*n* in the direction x.

In an ink jet printer constructed in the described manner, the sensor 6 detects the positions in the direction x of the ink drops 1*a*, 1*b*, . . . 1*n* which pass through the sensor. The system is calibrated before the printing operation is started according to the displacement of the ink drops. In the printing operation, the ink drops 1 are jetted by each of the drop generators 2 forming a multi-nozzle. After being charged by the charging electrodes 3, the ink drops are deflected in a time-series manner in the deflecting plane having the angle $\theta$, to strike the recording sheet 4 in a selected pattern. Because of the displacement angle $\theta$, the ink drops 1*a*, 1*b*, . . . 1*n* form a straight line extended in the direction x. The ink drops which do not contribute to the printing are recovered by a gutter (not shown).

In the above described ink jet printer, the displacement in the direction x of the ink drops 1 is detected by the sensor 6 in which detecting light emitted from the light emitting unit 6*a* in the direction y is received by the light receiving unit 6*b*. Accordingly, there is a distance g in the direction y between the ink drop 1*n*, the last drop deflected, and the ink drop 1*a* deflected first from adjacent drop generators 2 owing to the angle $\theta$ ($g = 0.16$ mm under certain conditions). However, the displacement in the direction y is not employed during calibration of the system, and, therefore, the print dots cannot be joined together with high accuracy. As a result, only limited improvement of the picture quality can be attained.

As indicated by the broken lines in FIG. 1, a light emitting unit 7*a* and a light receiving unit 7*b* may be disposed at both ends, in the direction x, of the sensor to detect the displacement.

OBJECTS AND SUMMARY OF THE INVENTION

In view of the foregoing, an object of the present invention is to determine a two dimensional position for each ink drop within an ink drop sensor at specific times;

Another object of the present invention is to improve the the quality of the print output of an ink jet printer by providing an ink drop sensor with greater precision.

Still another object of the present invention is an ink drop sensor which utilizes crossed pairs of light beams to generate two dimensional coordinates of ink drops passing through the sensor.

Yet another object of the present invention is an ink drop sensor which utilizes light beams to determine the presence and position of ink drops passing through the sensor.

These and other objects are accomplished by a drop sensor for an ink jet printer for detecting the positions of ink drops emitted from a drop generator as the ink drops fly toward a recording medium. The drop sensor comprises a plurality of light emitting elements for emitting light beams which cross in pairs in the space where the ink drops fly, each point of crossing in the space comprising a matrix point therein, a plurality of light receiving elements for receiving the light beams and for generating signals having magnitudes corresponding to the intensities of the received light beams, the coincidence of an ink drop and one of the matrix points in the space causing the generated signals of selected ones of the light receiving elements to generate electrical signals with low magnitudes, and means for determining from the generated signals the two-dimensional positions of the ink drops in the space.

BRIEF DESCRIPTION OF THE DRAWINGS

These and other object, features, and advantages of the invention, as well as the invention itself, will become more apparent to those skilled in the art when considered in the light of the accompanying drawings wherein.

DETAILED DESCRIPTION OF THE PREFERRED EMBODIMENT

Figure 1:
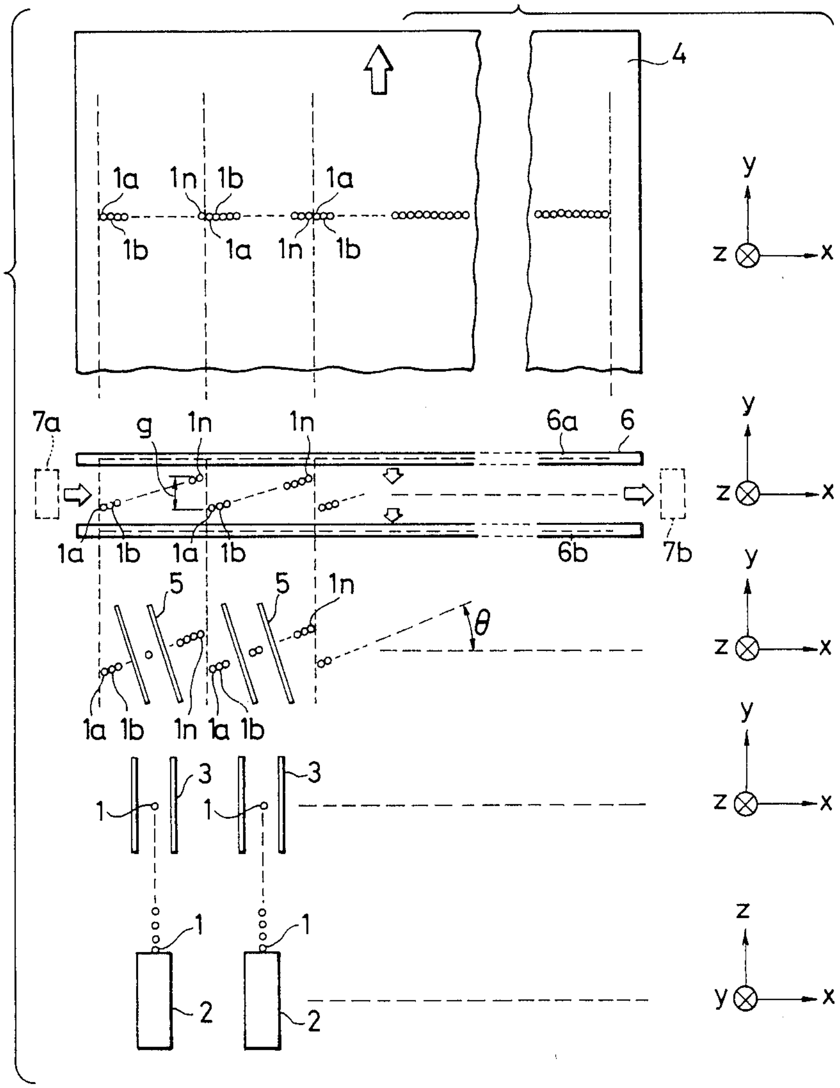
PRIOR ART FIG. 1
FIG. 1 is a schematic illustration of a prior ink drop printer.
Figure 2:
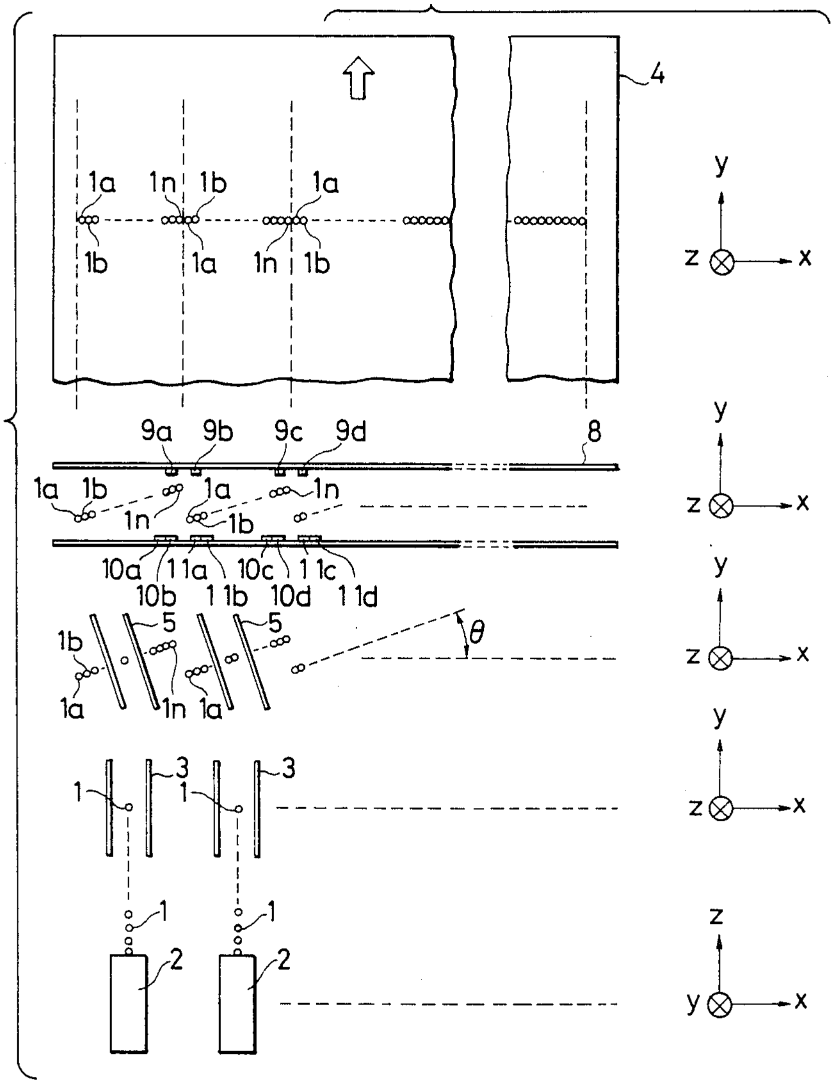
FIG. 2 is a schematic illustration of an ink drop printer including the drop sensor of the present invention.

FIG. 2 shows one embodiment of this invention and is different from FIG. 1 in that the sensor 6 is replaced by a sensor 8. The sensor 8 comprises an array of pairs of light emitting units (9*a* and 9*b*), (9*c* and 9*d*), . . . and (9*n* and 9*n*+1) for emitting crossed detecting light beams to detect the aforementioned ink drops 1*a* and 1*n* when the distance g is provided between the ink drops 1*a* and 1*n*. An array of pairs of light receiving units (10*a* and 10*b*), (10*c* and 10*d*), . . . and (10*n* and 10*n*+1) is provided for receiving the detecting light beams from the light emitting units 9*b*, 9*d*, . . . and 9*n*+1, respectively. An array of pairs of light receiving units (11*a* and 11*b*), (11*c* and 11*d*), . . . and (11*n* and 11*n*+1) is provided for receiving detecting light beams from the light emitting units 9a, 9c, . . . and 9n, respectively.

Figure 3:
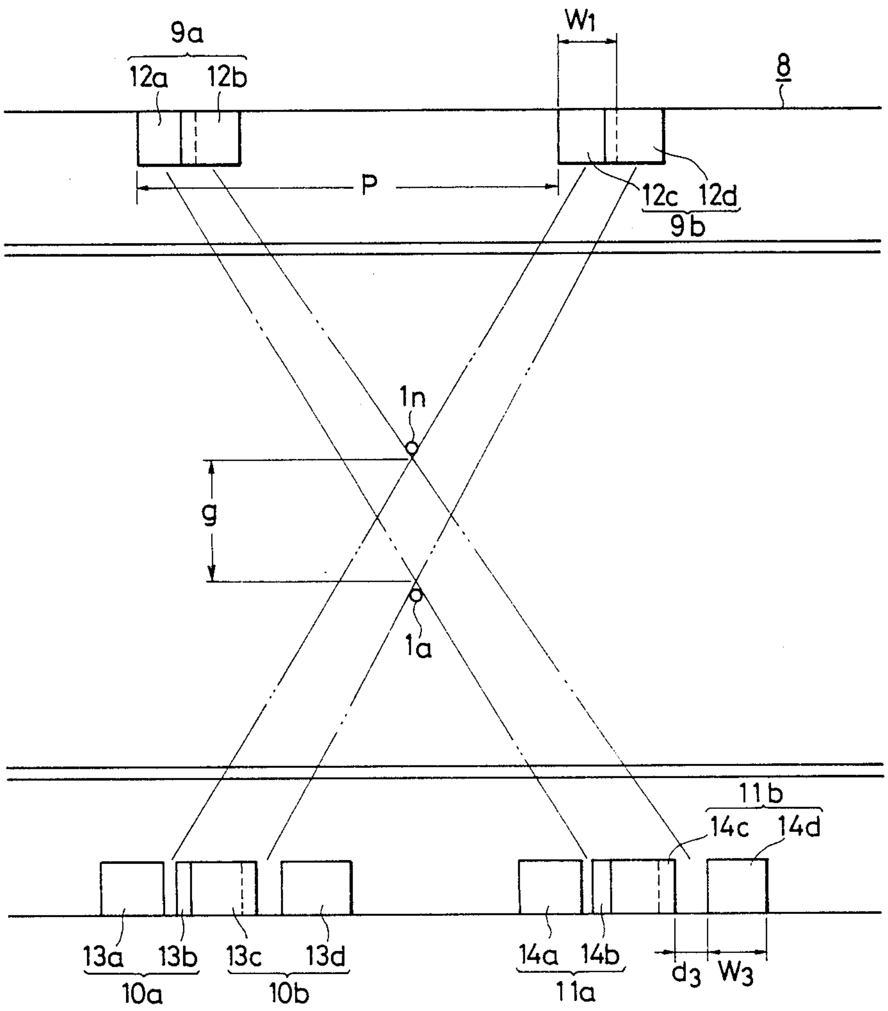
FIG. 3 is an enlarged view of the ink drop sensor of the present invention.
Figure 4A:
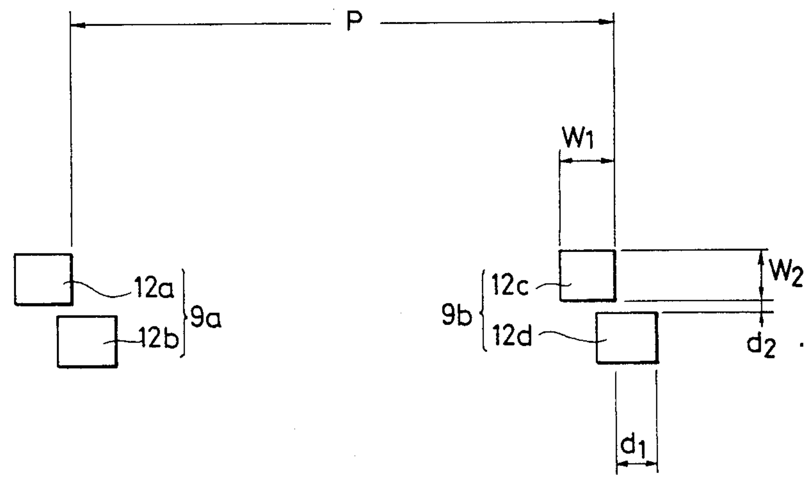
FIGS. 4(*a*) and 4(*b*) illustrate light emitting elements and light receiving elements used in the ink drop sensor of FIG. 3.
Figure 4B:
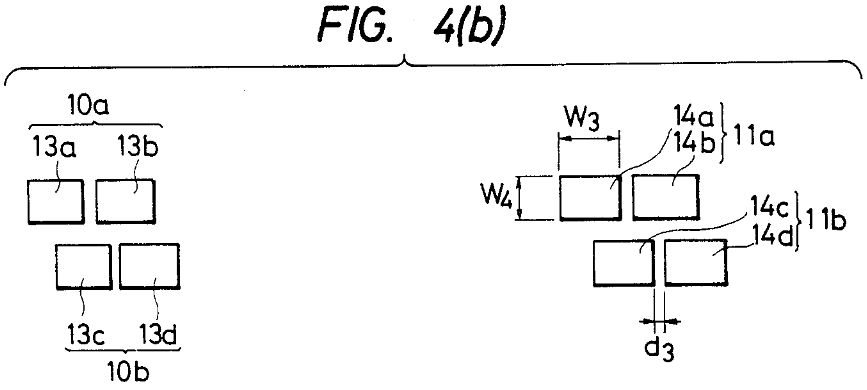

FIG. 3 and FIGS. 4(*a*) and 4(*b*) are enlarged views of the sensor 8. The light emitting unit 9a has a pair of light emitting diodes 12a and 12b and the light emitting unit 9b has a pair of light emitting diodes 12c, 12d. The light emitting diodes are covered with a glass plate 13.

On the other side, the light receiving unit 10a comprises the photodiodes 13a and 13b, the light receiving unit 10b comprises the photodiodes 13c and 13d, and the light receiving unit 11a comprises the photodiodes 14a and 14b.

The light emitting diodes 12a, 12b, 12c, and 12d have representative dimensions $W_1=0.25$ mm and $W_2=0.2$ mm. The light emitting diodes 12a and 12c are offset from the light emitting diodes 12b and 12d, respectively, by a representative distance $d_1=0.16$ mm in the direction x and by a representative distance $d_2=0.05$ mm in the direction z. The photodiodes 13a, 13b, 13c, and 13d, and 14a, 14b, 14c, and 14dhave representative dimensions $W_3=0.25$ mm and $W_4=0.175$ mm. The photodiodes 13a and 13b, 13c, and 13d, and 14a, 14b, 14c, and 14d have representative dimensions $W_3=0.25$ mm and $W_4=0.175$ mm. The photodiodes 13a and 13b, 13c, and 13d, 14a and 14b, and 14c and 14d are separated by a representative distance $d_3=50$ um in the direction x. These and the other dimensions given in this description are exemplary and may be changed without departing from the scope and spirit of the invention.

The light emitting units 9a and 9b comprising the light emitting diodes 12a and 12b, and 12c and 12d, respectively, the light receiving units 10a and 10b comprising the photodiodes 13a and 13b, and 13c and 13d, respectively, and the light receiving units 11a and 11b comprising the photodiodes 14a and 14b, and 14c and 14d, respectively, are arranged at a pitch, for example, P=2.5 mm. A representative distance of 3 mm separates the array of the light emitting units and the array of light receiving units.

Figure 5A:
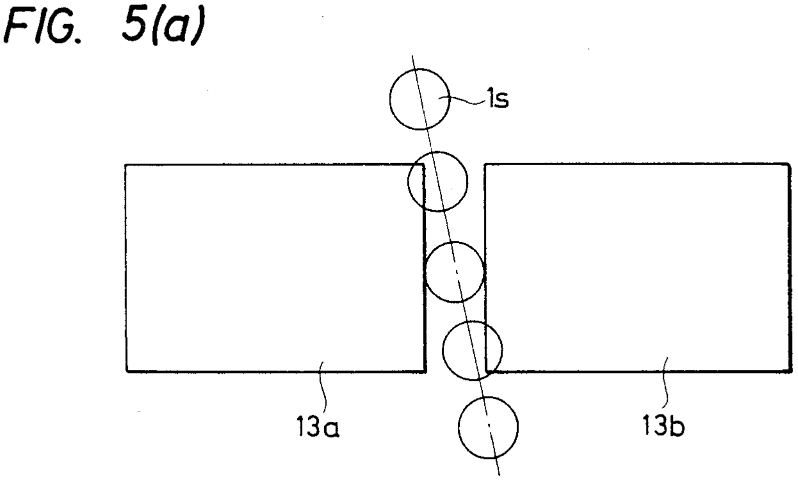
FIGS. 5(*a*) and 5(*b*) schematically illustrate the operation of the ink drop sensor of FIG. 3.
Figure 5B:
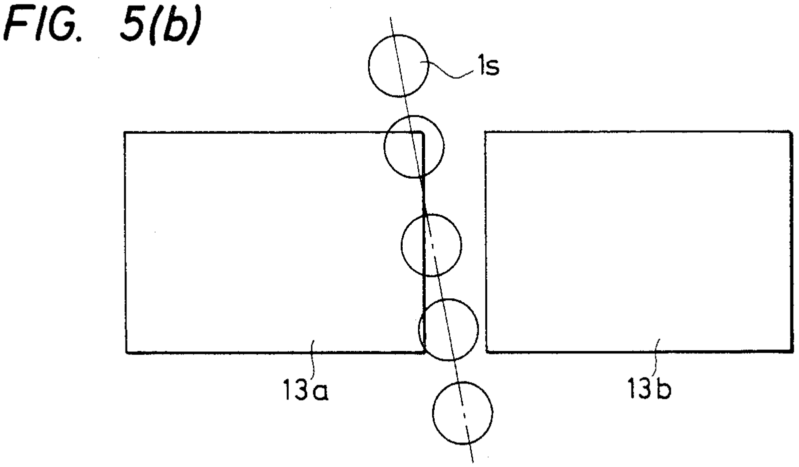

FIGS. 5(*a*) and 5(*b*) are enlarged views of the photodiodes 13a and 13b, showing the displacement with respect to time of the shadow 1s of an ink drop which flies at a representative angle of about 11° with respect to the direction z.

Figure 6:
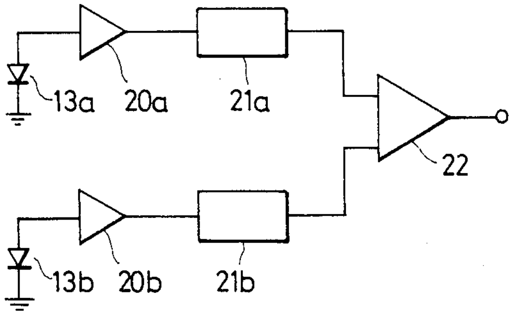
FIG. 6 is a schematic diagram of a comparison circuit used in the ink drop sensor of the present invention.

As shown in FIG. 6, means are provided for determining from the signals generated by the photodiodes the two dimensional positions of ink drops 1 in the space of the sensor 8. As embodied herein, the outputs of the photodiodes 13a and 13b are amplified by the amplifiers 20a and 20b, respectively, the peak values are held by peak hold circuits 21a and 21b, respectively, and the peak values are compared with each other in a differential amplifier 22.

In the operation of the drop sensor thus constructed, when the ink drops 1 are jetted from each drop generator 2 at the drop forming frequency, they are charged by the charging electrodes 3 according to the printing signal and with the charge timing. The charged ink drops 1 are deflected by the angle $\theta$ one after another by the deflecting electrodes 5 inclined at the angle $\theta$. The ink drops strike the recording sheet to form a line extended in the direction x.

In FIGS. 2 and 3, reference characters 1a, 1b, . . . 1n designate the ink drops 1 which have been deflected, as described above. When the ink drops 1a, 1b, . . . 1n pass through the sensor 8, the position of the ink drop 1a is detected from the outputs of the paired photodiodes 13c and 13d, and 14a and 14b which receive the detecting light beams from the light emitting diodes 12d and 12a, respectively. The position of the ink drop 1n is detected from the outputs of the paired photodiodes 13a and 13b, and 14c and 14d which receive the detecting light beams from the light emitting diodes 12b and 12c, respectively.

By way of example, the example of the paired diodes 13a and 13b shown in FIGS. 5(*a*) and 5(*b*) will be described. When the shadow 1s of the ink drop 1 passes through the middle between the diodes 13a and 13b, as shown in FIG. 5(*a*), the peak value held by the peak hold circuit 21a is equal to the peak value held by the peak hold circuit 21b. Accordingly, the output of the differential amplifier 22 is substantially zero.

On the other hand, when the shadow 1s of the ink drop 1 is shifted to the left from the middle between the diodes 13a and 13b as shown in FIG. 5(*b*) the peak value held by the peak hold circuit 21a is larger than the peak value held by the peak hold circuit 21b. As a result, the differential amplifier 22 generates an output which can be processed to determine the two-dimensional position in the directions y and x of the ink drop 1n. The distance $d_1$ between the light emitting diodes 12a and 12b, or 12c and 12d is, for example, 0.16 as previously described. Therefore, even if the distance g in the direction y between the ink drops 1n and 1a is of the order of 0.16 mm, for example, the ink drops can be detected in two dimensions in the common detecting space.

The drop generators 2 jet the ink drops 1. The ink drops 1 are formed by opening an electromagnetic valve of an ink circulating system not shown and will fly straight. Accordingly, in the stabilization procedure of the drop sensor the operating conditions of the light emitting unit (9a and 9b) and the light receiving unit (10c and 10d) may be utilized to detect whether the drop generators 2 jet the ink drops 1 or whether the drop generators 2 are clogged.

In the stabilization procedure, the timing of the charging pulse of the charging electrodes 3 is made synchronous with the timing of the formation of the ink drops 1. When the former timing is made synchronous with the latter timing, then the ink drop 1 flies to the position of the ink drop 1a or 1n while being deflected. Accordingly, the operation of the light emitting unit 9a and the light receiving units 11a and 11b or the operation of the light emitting unit 9b and the light receiving units 10a and 10b. may be utilized to detect whether or not the former timing is synchronous with the latter timing.

The velocity of flow of the ink drop 1 is adjusted in the stabilization procedure. The velocity of flow of the ink drop 1 is calculated from the time of an output provided by the operation of the light emitting unit and the light receiving unit and the time of the charging pulse. The velocity of flow thus calculated is set to a predetermined range by adjusting the pump voltage of the ink circulating system (not shown).

Also in the stabilization procedure, the charging voltage of the charging electrodes 3 is adjusted. The charging voltage is continuously adjusted so that when the ink drop 1 is deflected, it passes through the middle between the light emitting unit and the light receiving unit. That is, when the ink drop passes through the middle, the charging voltage is set properly.

The stabilization procedure can be achieved by performing the above-described steps. In the calibration of the system by the stabilization, the condition of the system can be determined from one ink drop 1 by the utilization of the light emitting and light receiving unit.

Therefore, stabilization can be achieved in a very short time.

Figure 7A:
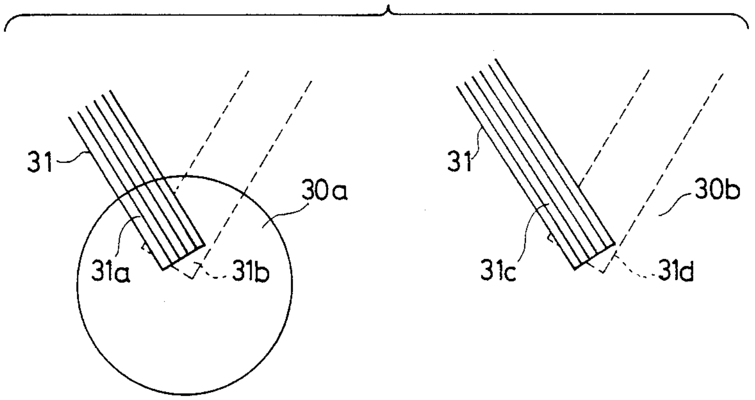
FIGS. 7(*a*) and 7(*b*) illustrate an alternate embodiment of the ink drop sensor of the present invention.
Figure 7B:
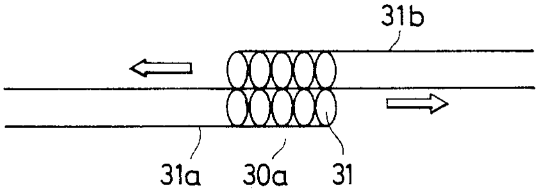

FIGS. 7(*a*) and 7(*b*) show a second embodiment of the invention. In this embodiment, a plurality of optical fibers 31, for example five fibers having a representative diameter of 50 um, are combined together in the form of a tape to form a light emitting element 31*a*. Similarly, light emitting elements 31*b*, 31*c*, and 31*d* are formed. The light emitting elements 31*a* and 31*b* are arranged so that their end portions obliquely cross each other, thus forming a light emitting unit 30*a*. Similarly, a light emitting unit 30*b* is formed by the light emitting elements 31*c* and 31*d*. The light emitting elements 31*a* through 31*d* are coupled to light sources such as halogen lamps (now shown).

In the drop sensor thus constructed, even if the emergent angle of the optical fiber 31 is small, i.e., from 6° to 10° for example, the light emitting elements 31*a* and 31*d* can emit crossed inspection light beams because the directions of emergence of the light emitting elements are oblique with respect to the light receiving unit (not shown). In the above-described embodiment, the optical fibers are used for forming the light emitting units. Similarly, the light receiving units may be formed with optical fibers. In this case, the drop sensor can be miniaturized without lowering the accuracy of detection. Accordingly, in the second embodiment, unlike the first embodiment shown in FIG. 3 and FIGS. 4(*a*) and 4(*b*), it is unnecessary to arrange the light emitting and receiving units in a zigzag pattern that is, the units can be arranged as one array.

As is apparent from the above description, with the ink jet printer drop sensor according to the present invention, the positions of the ink drops are determined from the results of detection which are obtained from a plurality of crossed detecting light beams. Therefore, the two-dimensional positions of the ink drops can be detected with high accuracy and without increasing the length of the detecting optical path.

While the salient features of the invention have been described with reference to the drawings, it should be understood that the preferred and alternate embodiments described herein are susceptible of modification and alteration without departing from the spirit and scope of the following claims.

What is claimed is:

1. A drop sensor for an ink jet printer for detecting the positions of ink drops emitted from a drop generator as the ink drops move toward a recording medium, the drop sensor comprising:

a plurality of light emitting elements aligned in a linear array for emitting light beams which cross in pairs in the region where the ink drops move, each point of crossing in said region comprising a matrix point therein;

a plurality of light receiving elements aligned in a linear array for receiving said light beams and for generating signals having magnitudes corresponding to the intensities of said received light beams, said linear array of light emitting elements and said linear array of light receiving elements being aligned and opposed with each other, the coincidence of an ink drop and one of said matrix points in said region causing the generated signals of selected ones of said light receiving elements to have reduced magnitudes; and means for determining from said generated signals the two-dimensional positions of said ink drops in said region.

2. A drop sensor according to claim 1 wherein said plurality of light emitting elements comprises a plurality of pairs of light emitting diodes aligned to define one edge of said space through which said ink drops fly.

3. A drop sensor according to claim 3 wherein said plurality of light receiving elements comprises a plurality of pairs of photodiodes aligned to define a second edge of said space through which said ink drops fly and to be aligned with corresponding ones of said pairs of light emitting diodes.

4. A drop sensor according to claim 3 wherein one of said light emitting diodes of one of said light emitting elements projects a light beam on one of said photodiodes of one of said light receiving elements and the other of said said light emitting diodes of one of said light emitting elements projects a light beam on one of said photodiodes of a said light receiving element adjacent to said one light receiving element.

5. A drop sensor according to claim 4 wherein said determining means comprises a plurality of detector circuits, each of said plurality of detector circuits being associated with and connected to a different one of said plurality of light receiving elements.

6. A drop sensor according to claim 5 wherein each of said detector circuits comprises:

a first amplifier connected to the output of one of said pairs of photodiodes of said associated light receiving element and a second amplifier connected to the output of the other of said pair of photodiodes of said associated light receiving elements;

a first sample and hold circuit connected to the output of said first amplifier for holding the peak value of the output of said first amplifier;

a second sample and hold circuit connected to the output of said amplifier for holding the peak value of the output of said second amplifier; and a comparator connected to the outputs of said first and second sample and hold circuits, said comparator being associated with one of said matrix points in said space for generating an output when one of said ink drops is coincident with one of said matrix points.

7. A drop sensor according to claim 6 wherein said photodiodes are arranged at a predetermined pitch.

8. A drop sensor according to claim 6 wherein said comparator comprises a differential amplifier.

9. A drop sensor according to claim 1 wherein each of said light emitting elements comprises at least one optical fiber.

10. A drop sensor for an ink jet printer for detecting the positions of ink drops emitted from a drop generator as the ink drops fly toward a recording medium, the drop sensor comprising;

a plurality of light emitting elements for projecting light beams which cross in the space where the ink drops fly;

a plurality of light receiving elements for receiving said projected light beams and for generating signals having magnitudes corresponding to the intensities of said light beams; and means for determining a two dimensional position for each of said ink drops within said space from said signals generated by said light receiving elements.

* * * * *